(12) United States Patent
Franzaroli

(10) Patent No.: US 11,939,090 B2
(45) Date of Patent: Mar. 26, 2024

(54) APPARATUS FOR THE TREATMENT OF ARTICLES

(71) Applicant: PULSAR S.R.L., Castel Maggiore (IT)

(72) Inventor: Massimo Franzaroli, Castel Maggiore (IT)

(73) Assignee: PULSAR S.R.L.

( * ) Notice: Subject to any disclaimer, the term of this patent is extended or adjusted under 35 U.S.C. 154(b) by 0 days.

(21) Appl. No.: 16/956,443

(22) PCT Filed: Dec. 21, 2018

(86) PCT No.: PCT/IB2018/060530
§ 371 (c)(1),
(2) Date: Jun. 19, 2020

(87) PCT Pub. No.: WO2019/123421
PCT Pub. Date: Jun. 27, 2019

(65) Prior Publication Data
US 2020/0339291 A1  Oct. 29, 2020

(30) Foreign Application Priority Data
Dec. 22, 2017  (IT) ........................ 102017000149467

(51) Int. Cl.
*B65B 35/44*  (2006.01)
*B65B 25/14*  (2006.01)
(Continued)

(52) U.S. Cl.
CPC ............ *B65B 25/146* (2013.01); *B65B 35/44* (2013.01); *B65B 35/243* (2013.01); *B65B 59/001* (2019.05);
(Continued)

(58) Field of Classification Search
USPC ........................................................... 53/209
See application file for complete search history.

(56) References Cited

U.S. PATENT DOCUMENTS

2004/0011005 A1\* 1/2004 Daoust .................... B65B 11/10
53/529
2006/0130431 A1  6/2006 Baggot et al.
(Continued)

FOREIGN PATENT DOCUMENTS

EP        1775221 A1    4/2007
IT     UB20159738 A1    6/2017
(Continued)

OTHER PUBLICATIONS

International Search Report dated Jun. 3, 2019 from counterpart PCT App No. PCT/IB2018/060530.

*Primary Examiner* — Chinyere J Rushing-Tucker
(74) *Attorney, Agent, or Firm* — SHUTTLEWORTH & INGERSOLL, PLC; Timothy J. Klima

(57) ABSTRACT

An apparatus for the treatment of articles such as rolls made of paper material, and/or packets, packs, envelopes, bags, pallets or boxes, or another type of packaging. The apparatus includes a feeding device for feeding the articles, at least one unit for treating the articles, a transferring device for transferring the articles from the feeding device to the treatment unit, and an arranging device able to arrange the articles in respective groups of articles, each group including one or more articles arranged according to a respective and desired configuration of utilization by the treatment unit. In the apparatus, the arranging device is defined by the transferring device.

17 Claims, 11 Drawing Sheets

(51) Int. Cl.
    *B65B 35/24*     (2006.01)
    *B65B 59/00*     (2006.01)
    *B65B 63/02*     (2006.01)

(52) U.S. Cl.
    CPC ...... *B65B 63/02* (2013.01); *B65G 2201/0232* (2013.01)

(56) References Cited

U.S. PATENT DOCUMENTS

| | | | |
|---|---|---|---|
| 2007/0125242 A1* | 6/2007 | Dall'Omo | B65B 65/003 99/450.4 |
| 2008/0216451 A1* | 9/2008 | Stafford | B65B 35/54 53/154 |
| 2013/0334008 A1* | 12/2013 | Overley | B65G 47/30 206/391 |
| 2016/0096694 A1* | 4/2016 | Baylor | B65B 5/105 414/774 |
| 2018/0134425 A1* | 5/2018 | Grassi | B65B 11/04 |

FOREIGN PATENT DOCUMENTS

| | | |
|---|---|---|
| WO | 2016135662 A1 | 9/2016 |
| WO | 2016135664 A2 | 9/2016 |
| WO | 2016135667 A2 | 9/2016 |

\* cited by examiner

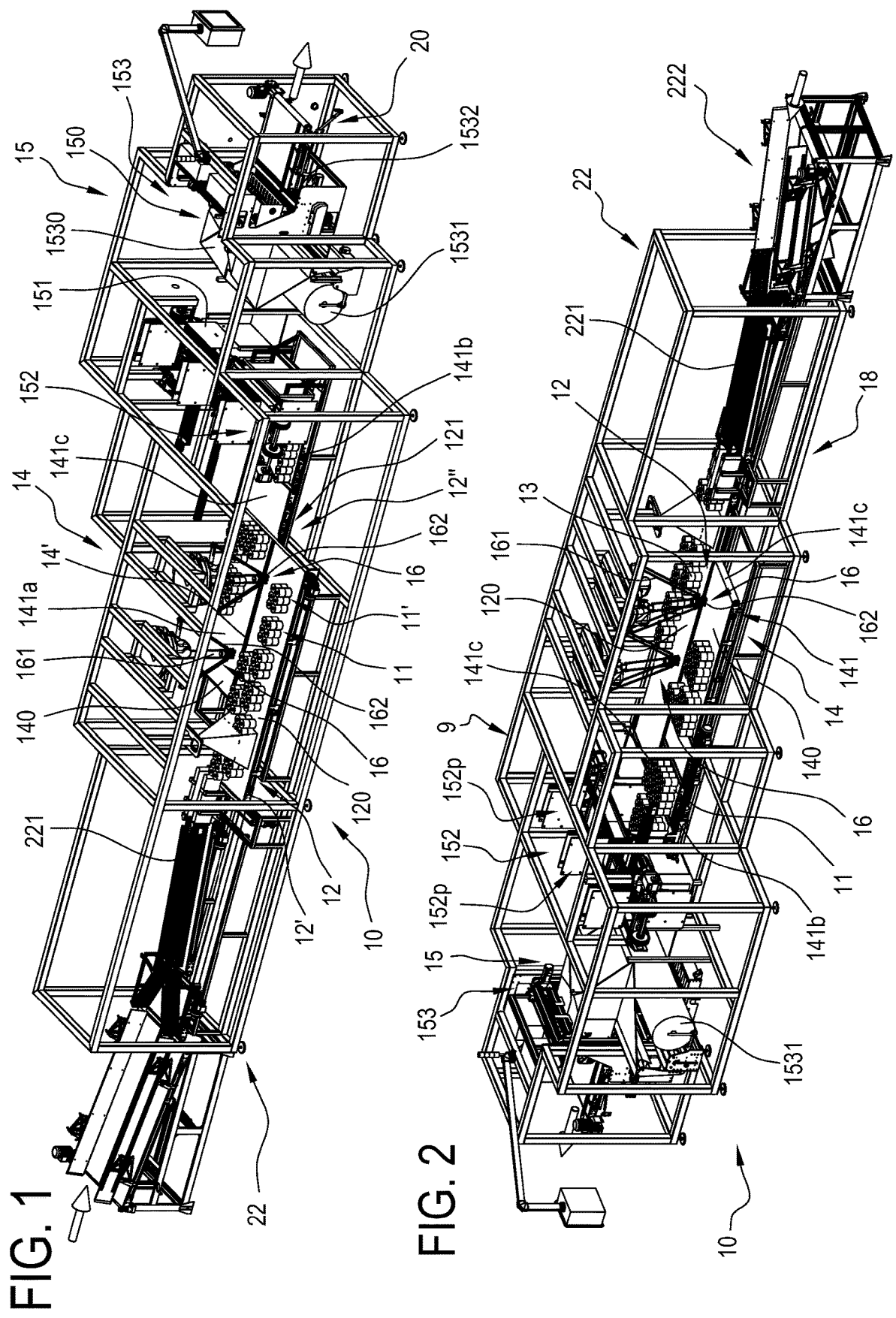

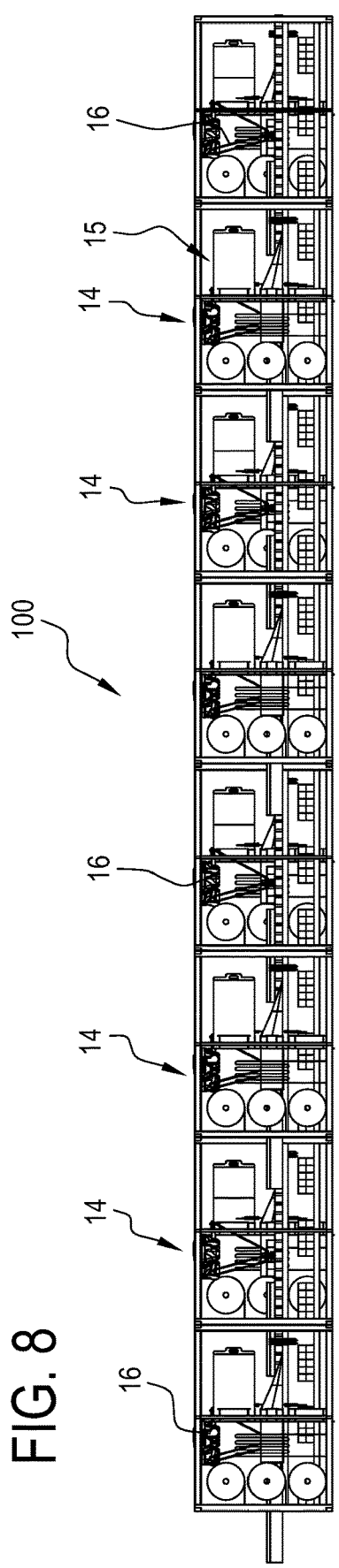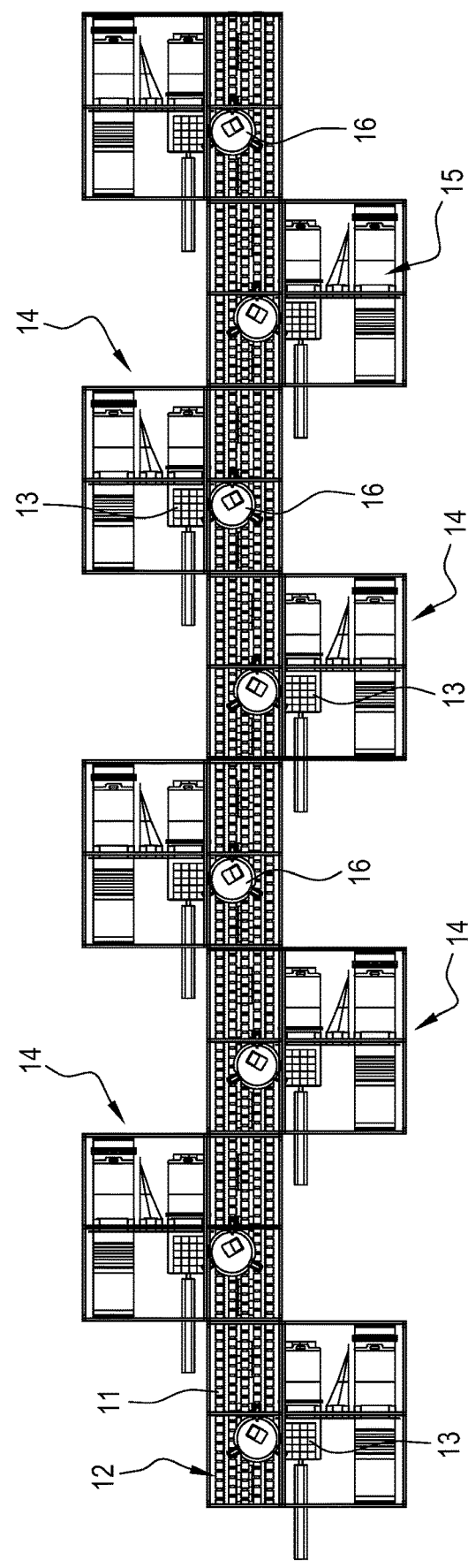

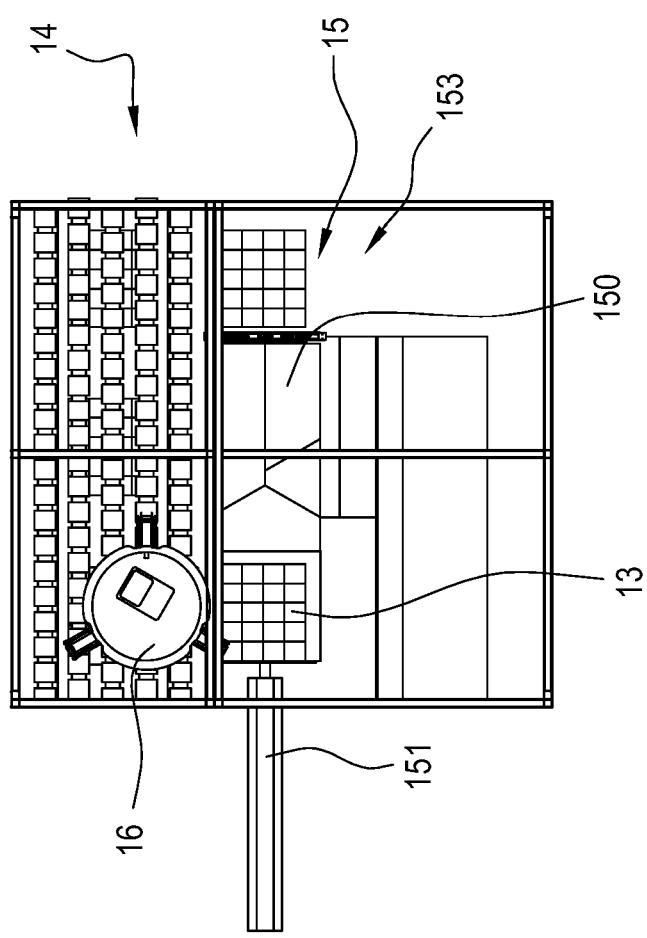
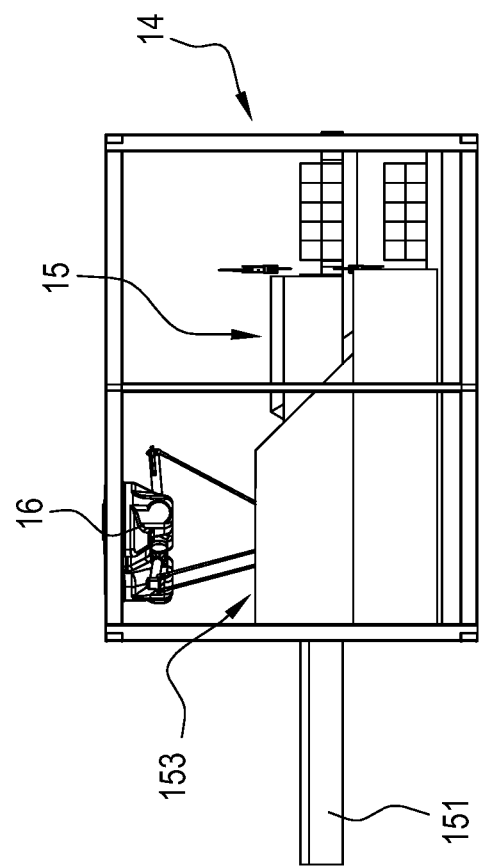
FIG. 10C
FIG. 10D

APPARATUS FOR THE TREATMENT OF ARTICLES This application is a National Phase of International Application PCT/IB2018/060530 filed Dec. 21, 2018 which designated the U.S. and that International Application was published under PCT Article 21(2) in English.

This application claims priority to Italian Application No. 102017000149467 filed Dec. 22, 2017, which application is incorporated by reference herein.

FIELD OF THE PRESENT INVENTION

The present invention refers to an apparatus for the treatment of articles.

In particular, said articles are in the form of articles of the tissue sector or of the nonwoven sector of another sector.

Especially, said articles are defined by products and/or by packages of respective products.

In particular, said products are in the form of rolls, in particular of toilet paper or of kitchen paper, big rolls, wipes, napkins, nappies, sheets, or other, preferably made of paper material, and/or said packagings are preferably in the form of packets, packs, envelopes, bags, pallets or boxes, for example cardboard or pasteboard, or in the form of another type of packaging.

STATE OF THE ART

Apparatuses are known for the treatment of articles, in particular articles of the tissue sector, in the form of corresponding machines for packaging said articles, which comprise corresponding means for feeding said articles, at least one unit for treating, or packaging the same articles, means for transferring said articles from said feeding means to the same treating or packaging unit, which are adapted to arrange said articles in respective groups of articles.

In practice, in known packaging machines, means are provided that are able to arrange said articles in respective groups of articles which are thus defined directly by the same packaging machine.

In particular, in the tissue sector, the plants or apparatuses for producing and packaging said articles are composed with apparatuses manufactured by different companies, each specialised in the production of a specific type of machine.

These companies manufacturing specialised machines of the plant operate according to the philosophy of maximising the working rate of the apparatuses whose production is their specialisation.

Conversely, while said apparatuses or machines are, in themselves, particularly quick in treating the respective product, are rather rigid in use, and such as not to allow the easy execution of changes of format of the product being processes, which format changes are limited to a restricted number of possibilities of product configurations, which in addition are poorly diversified from each other.

In fact, the companies that make "tissue" products and that use said known apparatuses for making respective products, to obtain a certain productive flexibility, are practically forced to purchase different working lines, having respective packaging machines able to operate in wholly differentiated manners.

In addition, nowadays the market is constantly evolving and requires constant changes to the products, in particular to the packagings of the products, that are sold, also through "online sales", i.e. sales made through the Internet. In practice, the consumer goods market is becoming oriented towards making products and packagings that are totally personalised for the specific consumer.

Currently, to try to follow these recent market trends, companies that manufacture products, in particular also those of the tissue sector, have opted, and still think of opting, to build imposing warehouses for storing different types of products, in view of their future and hoped-for sale on the market.

However, the latter operating strategy entails high investments and a considerable risk of production losses and hence it is a source of waste, thus being quite unwelcome for said companies.

Therefore, in the sector there is a need to have available an apparatus that is particularly flexible in use or employment.

Moreover, in the sector there is a need to have available an apparatus that is able to operate on several types of products.

Furthermore, in the sector there is a need to have available an apparatus that is easily adaptable to meet the needs of users or consumers.

In addition, in the sector there is a need to have available an apparatus that makes it possible to avoid excessively high investment costs.

In the sector there is also a need to have available an apparatus that operates in a particularly effective, efficient and/or reliable manner.

In addition, in the sector there is a need to have available an apparatus that has a particularly reduced bulk.

Moreover, in the sector there is a need to have available an apparatus that allows to easily carry out restoring interventions in case of problems.

Besides, in the sector there is a need to have available an apparatus that is easy to build or set up.

Additionally, in the sector there is a need to have available an apparatus that has rather short construction times.

Furthermore, in the sector there is a need to have available an apparatus that allows an easy reutilisation of components.

In the sector there is also a need to have available an apparatus that is particularly easy and simple to operate.

Lastly, in the sector there is a need to have available an apparatus that has a construction cost that is as low as possible.

SUMMARY OF THE INVENTION

The present invention is intended to propose a solution that is new and/or alternative to prior art solutions and in particular to overcome one or more of the above drawbacks or problems, and/or to meet one or more needs perceived in the art, and in particular inferred from the above.

Hence, an apparatus for the treatment of articles is provided, in particular said articles being in the form of articles of the tissue or nonwoven sector or of another sector, and especially said articles being defined by products and/or by packagings of respective products, said products being preferably in the form of rolls, in particular of toilet paper or of kitchen paper, big rolls, wipes, handkerchiefs, napkins, nappies, sheets, or others, preferably made of paper material, and/or said packagings being preferably in the form of packets, packs, envelopes, bags, pallets or boxes, for example made of cardboard or pasteboard, or in the form of another type of packaging; the apparatus comprising corresponding means for feeding said articles, at least one unit for treating said articles, means for transferring said articles from said feeding means to the same treatment unit, and means that are able to arrange said articles in respective groups of articles, in which each group of articles comprises one or more articles that are arranged according to a respective and desired configuration of use by said treatment means; the apparatus being characterised in that said means that are able to arrange said articles in respective groups of articles arranged according to a respective and desired configuration are defined by said means for transferring said articles on the respective treatment unit.

In this way, it is thus possible to obtain an apparatus that has considerable flexibility of use.

BRIEF DESCRIPTION OF THE DRAWINGS

This and other innovative aspects, or specific advantageous embodiments are, nonetheless, set forth in the following claims, whose technical features are readily apparent in the following detailed description, illustrating preferred and advantageous embodiments of the invention, which however is to be considered as purely exemplifying and non-limiting; said description being provided with reference to the accompanying drawings, in which:

FIG. 1 shows a schematic perspective view of a first preferred embodiment of an apparatus according to the present invention;

FIG. 2 shows a schematic perspective view of the first preferred embodiment of an apparatus according to the present invention, taken from the site opposite that of FIG. 1;

FIG. 7 shows a schematic top plan view of the second preferred embodiment of an apparatus according to the present invention;

FIG. 8 shows a schematic side elevation view of the second preferred embodiment of an apparatus according to the present invention;

FIG. 10C shows a schematic perspective view of the second preferred embodiment of a module usable in the second preferred embodiment of an apparatus according to the present invention;

FIG. 10D shows a schematic side elevation view of the second preferred embodiment of a module usable in the second preferred embodiment of an apparatus according to the present invention;

DETAILED DESCRIPTION OF PREFERRED EMBODIMENTS OF THE INVENTION

Figure 3:
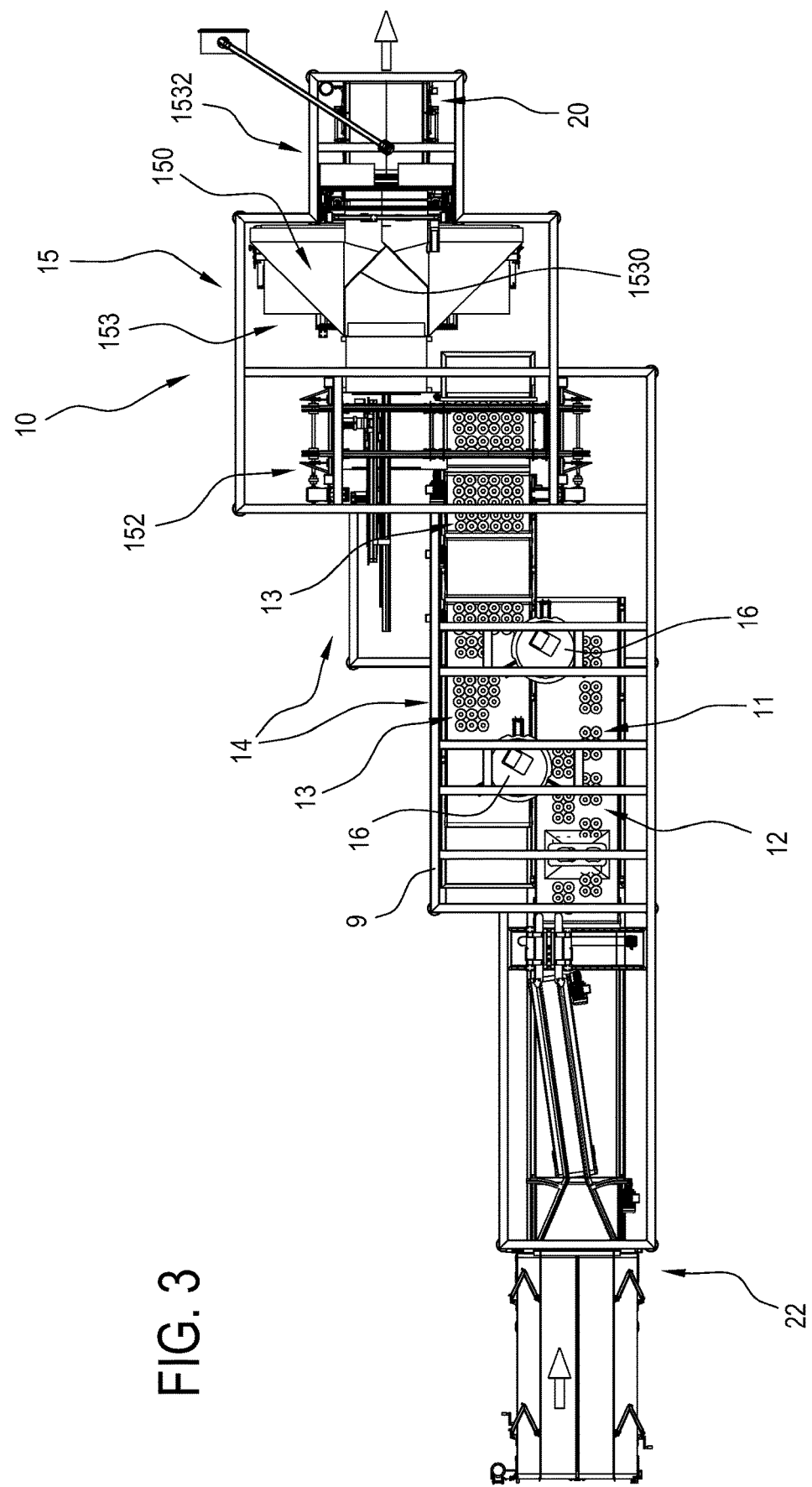
FIG. 3 shows a schematic top plan view of the first preferred embodiment of an apparatus according to the present invention.
Figure 4:
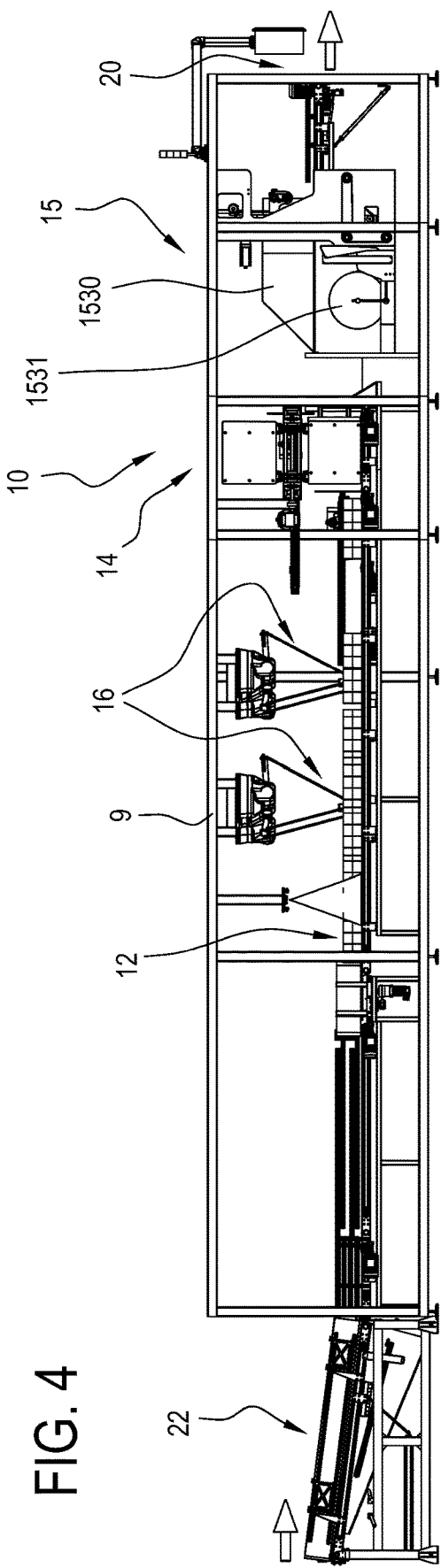
FIG. 4 shows a schematic side elevation view of the first preferred embodiment of an apparatus according to the present invention.
Figure 5:
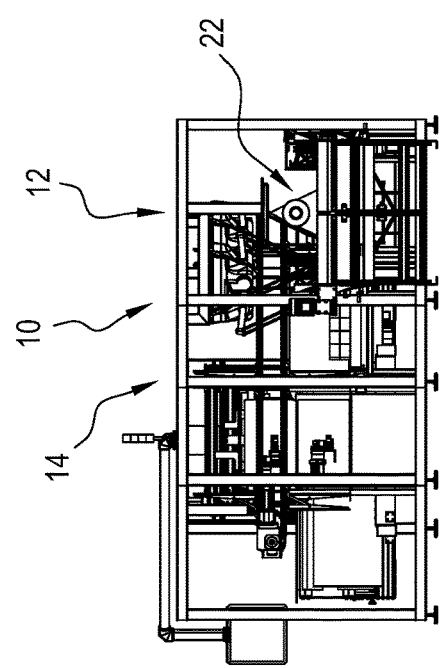
FIG. 5 shows a schematic rear elevation view of the first preferred embodiment of an apparatus according to the present invention.
Figure 6:
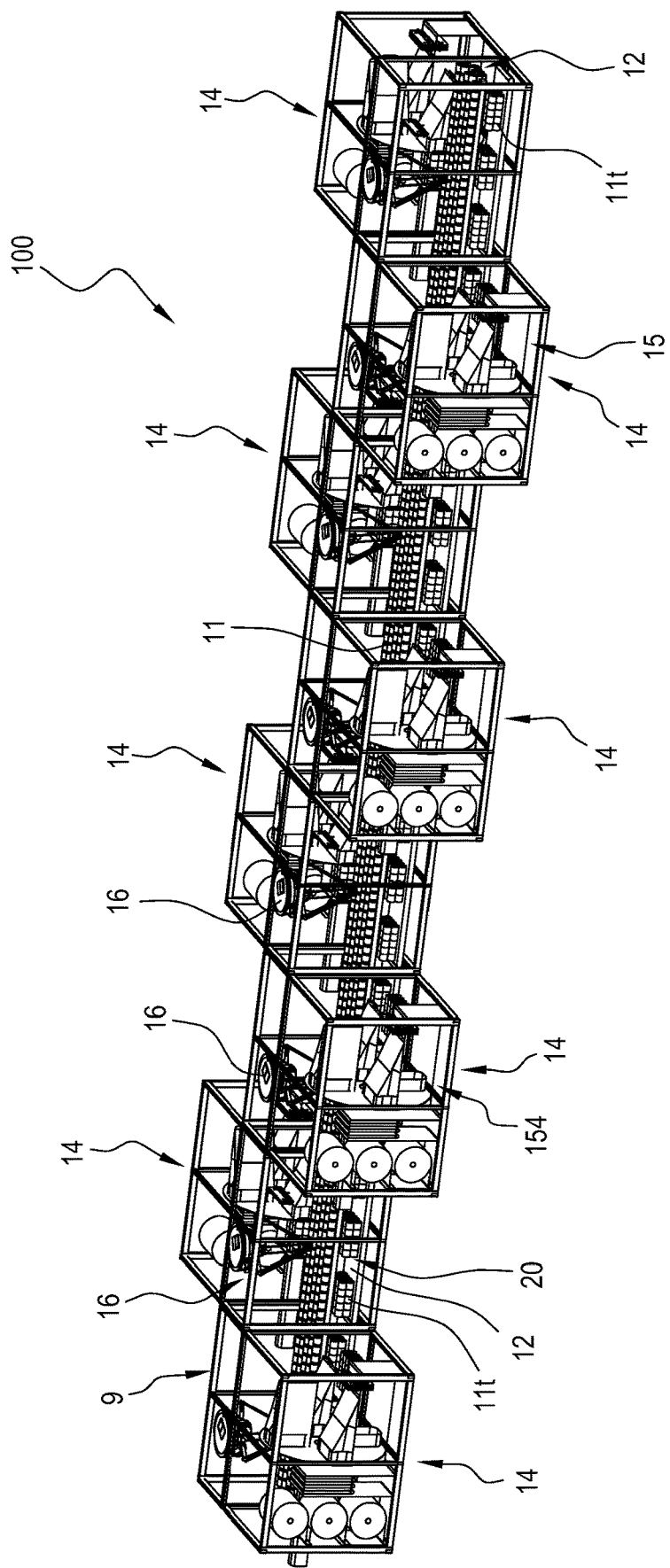
FIG. 6 shows a schematic perspective view of a second preferred embodiment of an apparatus according to the present invention.
Figure 9A:
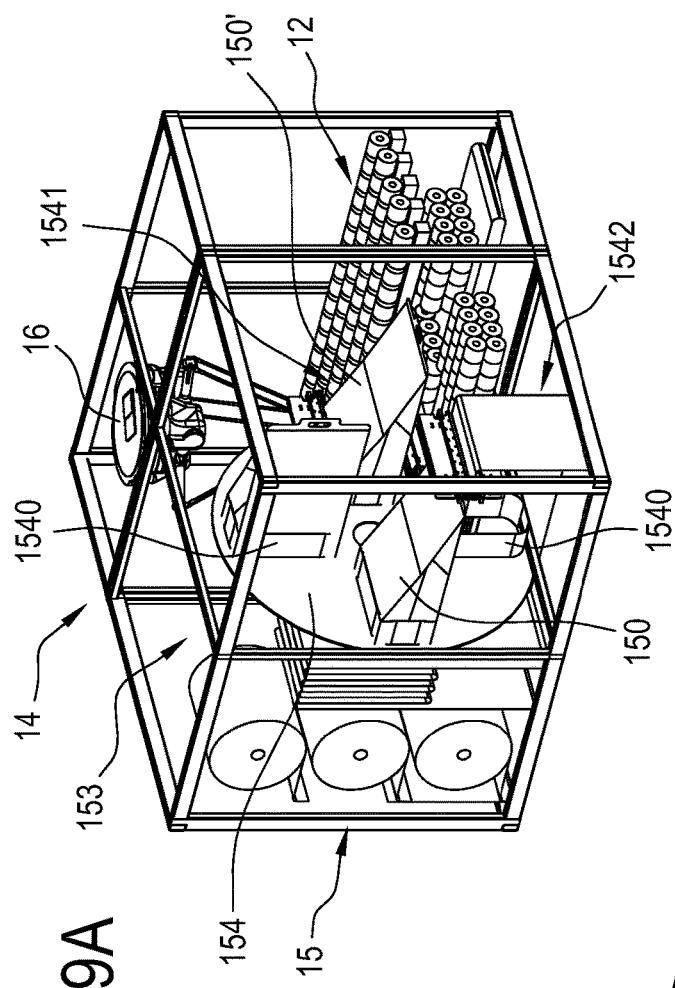
FIG. 9A shows a schematic perspective view of a first preferred embodiment of a module usable in the second preferred embodiment of an apparatus according to the present invention.
Figure 9B:
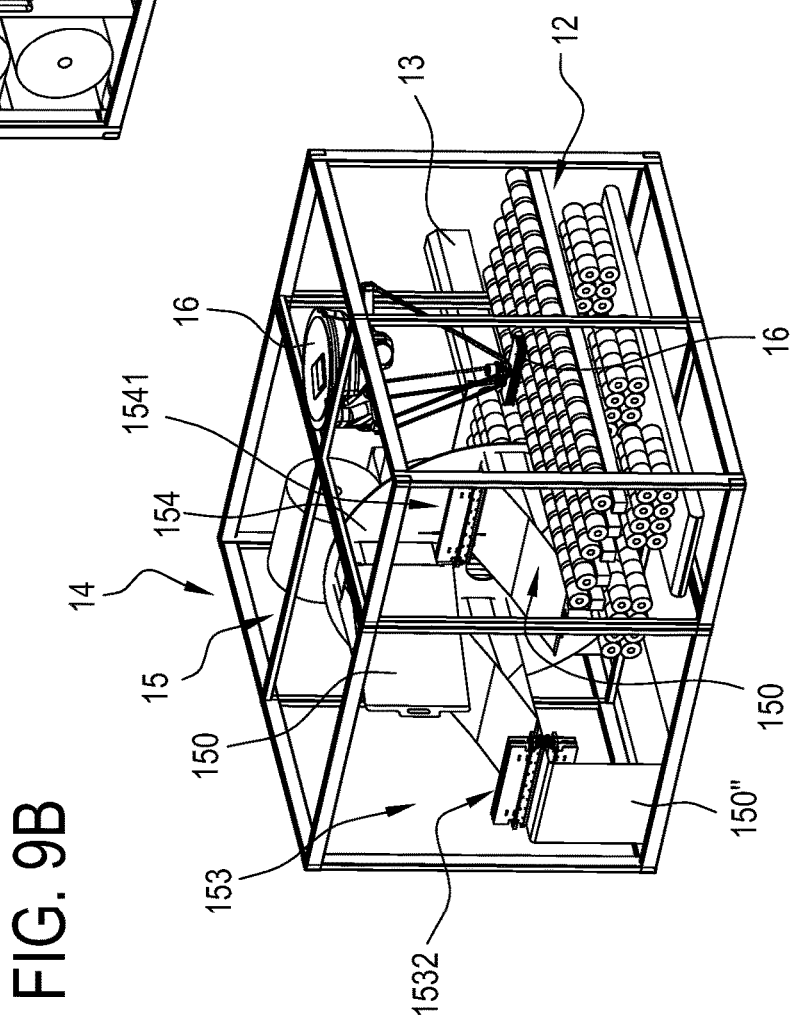
FIG. 9B shows a schematic perspective view of the first preferred embodiment of a module usable in the second preferred embodiment of an apparatus according to the present invention, taken from a different side from that of FIG. 9A.
Figure 9D:
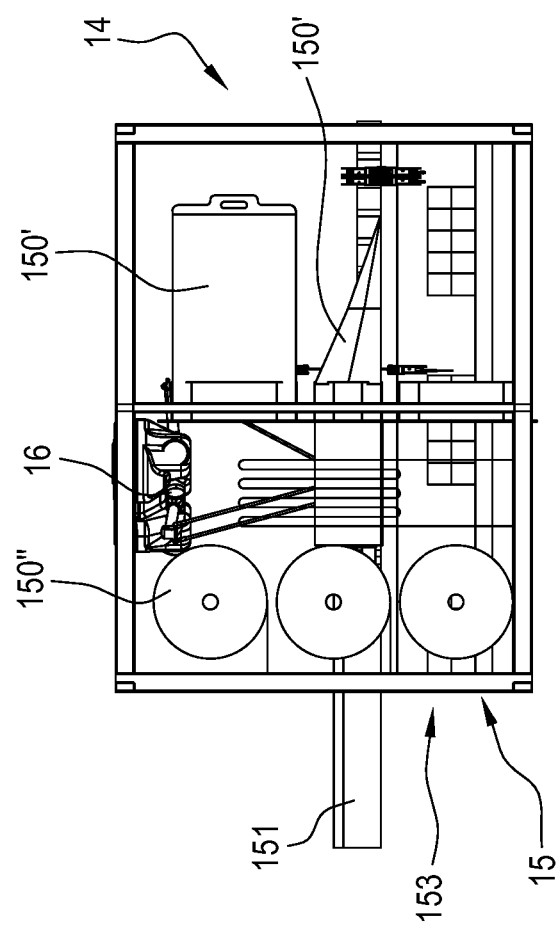
FIG. 9D shows a schematic side elevation view of the first preferred embodiment of a module usable in the second preferred embodiment of an apparatus according to the present invention.
Figure 9C:
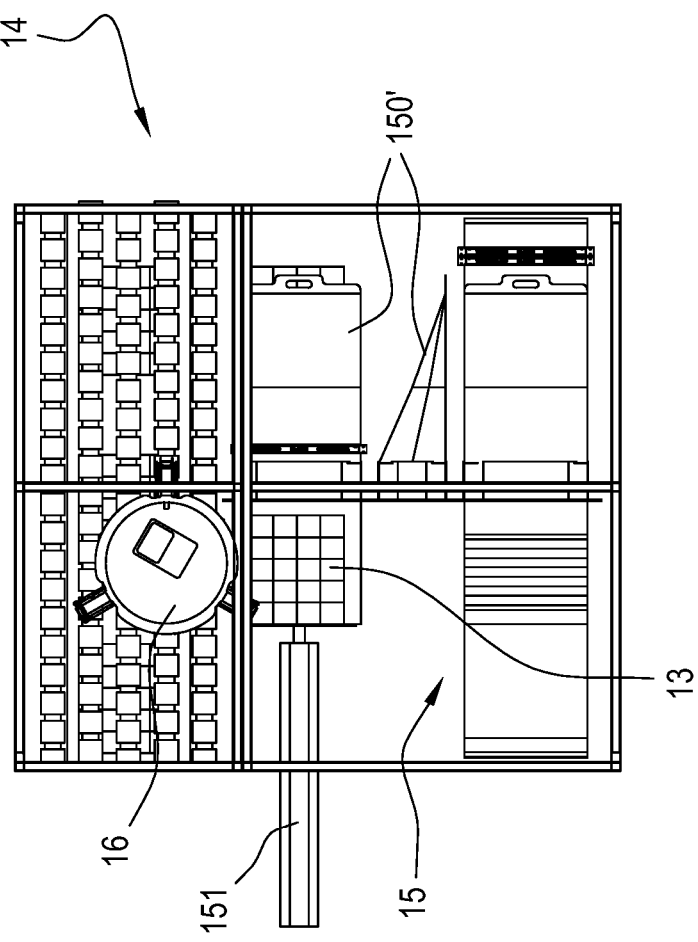
FIG. 9O shows a schematic perspective view of the first preferred embodiment of a module usable in the second preferred embodiment of an apparatus according to the present invention.
Figure 10A:
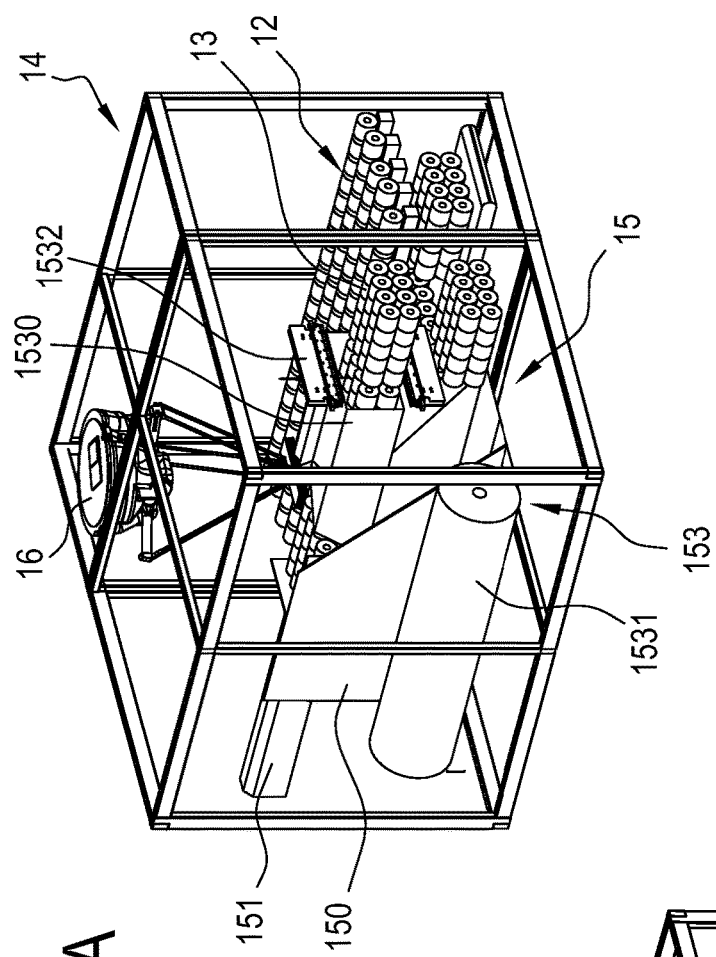
FIG. 10A shows a schematic perspective view of a second preferred embodiment of a module usable in the second preferred embodiment of an apparatus according to the present invention.
Figure 10B:
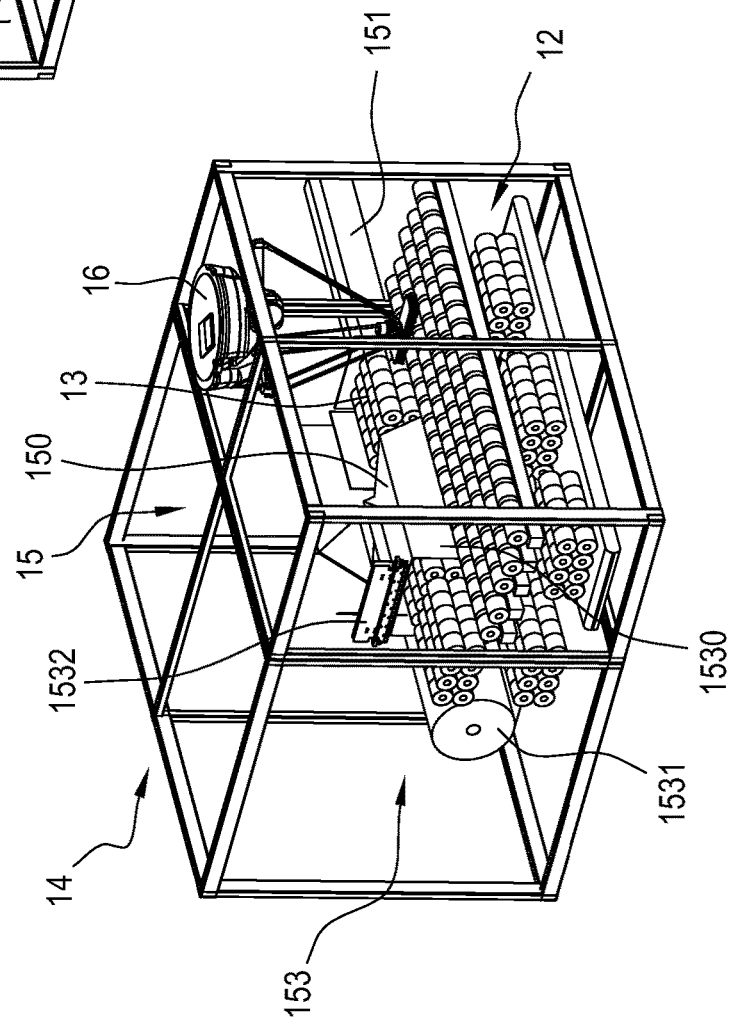
FIG. 10B shows a schematic perspective view of the second preferred embodiment of a module usable in the second preferred embodiment of an apparatus according to the present invention, taken from a different side from that of FIG. 10A.

The accompanying figures from 1 to 5 shows a first preferred embodiment 10 of an apparatus for the treatment of articles 11, in particular said articles being in the form of articles of the tissue sector or nonwoven sector of another sector, and especially said articles being defined by products and/or by packagings of respective products.

In particular, said products are preferably in the form of rolls, in particular of toilet paper or of kitchen paper, big rolls, wipes, napkins, nappies, sheets, or other, preferably made of paper material, and/or said packagings are preferably in the form of packets, packs, envelopes, bags, pallets or boxes, for example cardboard or pasteboard, or in the form of another type of packaging.

In particular, said products of the nonwoven sector being definable by nappies, incontinence pads, sanitary pads, preferably packaged in respective packages or packets.

In particular, the articles are preferably produced by a respective machine, preferably inside the same plant, for example the rolls are obtained from a respective machine for cutting off elongated logs, while already packaged products to be wrapped in a secondary package are packaged by a respective packaging apparatus, preferably also within the same plant.

The present apparatus 10, then, comprises, as illustrated, corresponding means, or conveyor, 12 for feeding said articles 11 to be treated, at least one unit 14 for treating said articles 11, means 16 for conveying said articles from said feeding means 12 to the same treatment unit 14, and means that are able to arrange said articles in respective groups 13 of articles, in which each group of articles 13 comprises one or more articles that are arranged according to a respective and desired configuration of use by said treatment means 14.

Advantageously, the means that are able to arrange said articles in respective groups 13 of articles, arranged according to a respective and desired configuration, are defined by said means 16 for conveying said articles on the respective treatment unit 14.

In this way, it is thus possible to obtain an apparatus that has considerable flexibility of use.

In particular, there can be different configurations of said articles on the respective treatment unit 14, and such configurations can be appropriately programmable and obtained in succession, under the control of corresponding electronic control means, in particular under the control of the electronic processing unit of the apparatus or of the plant in which the same apparatus is inserted.

Advantageously, as is readily apparent in particular in the figures from 6 to 10D, relating to a second preferred embodiment 100 of the present apparatus, the apparatus is provided with a plurality of units 14 for treating said articles 11, in which, in particular, each treatment unit 14 has respective and dedicated means 16 for transferring the articles to the respective treatment unit 14.

In this way, it is possible to increase the production capacity of the apparatus and in particular its flexibility. Said units can be provided for performing the same treatments, or differentiated treatment, of the articles 11, so as to be able to satisfy in a particularly quick manner the specific production needs of the moment.

Advantageously, as is readily apparent from the figures from 6 to 8, said units 14 for treating said articles 11 are distributed along the direction of development and of advance 11, by the means 12 for feeding the same articles of this second preferred embodiment.

Advantageously, as is readily apparent in said figures from 6 to 8, each unit 14 for treating said articles 11 is positioned at a respective area, in particular at a longitudinal area of said means 12 for feeding the articles 11, or at a respective area along the direction of development and advance, of the same articles 11, by said feeding means 12.

Advantageously, as is readily apparent from the figures from 6 to 8, said units 14 for treating the articles 11 are positioned at areas of said feeding means 12, in particular at longitudinal areas, or at areas situated along the direction of development and advance, of the same articles 11, by the same feeding means 12, which are adjacent to each other.

In particular, as is readily apparent in said figures from 6 to 8, said units 14 for treating said articles 11 are arranged on both sides, especially, in a mutually alternated manner, of the same feeding means 12.

In practice, a respective treatment unit 14 is situated on a respective side of said means 12 for feeding the articles and the treating unit or units adjacent thereto, along the longitudinal direction, or direction of advance, are situated at the opposite side of the same means 12 for feeding the articles.

Advantageously, said means 16 for transferring the articles to the treatment unit 14 are able to, or can be appropriately programmed to, modify the configuration of the respective group of articles 13 that they pass to, or position on, the respective treatment unit 14, in particular according to a respective and different treatment need.

In this way, the apparatus has a considerable level of production flexibility.

Advantageously, as is readily apparent from the figures, said means for transferring the articles to the treatment mean 14 comprise one or more devices 16, 16 for transferring respective articles 11.

In particular, preferably, as is readily apparent from said figures from 1 to 4, said means for transferring the articles to the treatment unit 14 comprise a plurality of transferring devices for respective treatment unit 14, especially, as is illustrated in relation to the first preferred embodiment 10 of apparatus, a first and a second transferring devices 16, 16 for each treatment unit 14.

Preferably, as is readily apparent from the figures, each transferring device 16 preferably moves a single article 11 at a time, it must nevertheless be understood that said transferring device 16 could also be configured so as to move more than a single article at a time.

Advantageously, as is readily apparent from the figures from 1 to 4, the respective device 16 for transferring respective articles 11 transfers the articles 11 of a respective row of articles 11' being fed.

Advantageously, as is readily apparent from the figures from 1 to 4, the respective device 16 for transferring respective articles 11 is adapted to realise a respective part of the group of articles 13, in particular a respective row of articles 11 of the respective group of articles 13, preferably transferring the articles 11 that are picked up from a respective and corresponding row 11' of articles being fed.

In this way, the transfer run is minimised and the transferring capacity of the same transferring means is improved.

Advantageously, as is readily apparent from the figures, in both said first and second preferred embodiments, the respective transferring device 16 is defined by a robot, preferably by a parallel robot, in particular by a Delta robot. According to a different embodiment, not shown in the accompanying figures, one could however image using also other transferring means, or using other types of robot devices.

In particular, as is readily apparent from the figures, the respective transferring device 16 performs an outward stroke between a pick-up position of the respective article 11, in particular on said feeding means 12, and a release position of the respective article 11, in particular on said treatment unit 14, and a return stroke between said release position and said pick-up position, preferably said outward stroke and said return stroke are mutually corresponding, or substantially corresponding.

In this way, the transfer run is minimised and the transferring capacity of the same transferring means is improved.

It must nonetheless be understood that the outward and return stroke provided by the respective transferring device 16 could be according to any desired and/or appropriately programmed trajectory.

Preferably, as is readily apparent from the figures, the respective transferring device 16 moves the respective article 12 transversely to the direction, in particular longitudinal, of development and advance, of the same articles 11, by said feeding means 12.

Advantageously, as is readily apparent from the figures, the respective transferring device 16 is adapted to pick up the respective article 11 from said feeding means 12 of the same articles 11, in particular lifting the same article 11 from said feeding meanings 12.

Moreover, advantageously, said transferring device 16 is adapted to release the respective article 11 to the unit 14 for treating the articles, in particular lowering and setting the same article 11 down on the same treatment unit 14.

In particular, as is readily apparent from the figures, the respective transferring device 16 comprises means 163 for gripping the respective article 11.

In particular, according to the first preferred embodiment 10 of apparatus, said means for gripping the respective article 11 are in the form of corresponding gripping, or pliers, means 162. Other gripping means can nonetheless be used, in particular aspirating means, possibly in combination with pliers means, and such gripping means can have actuation that is mechanical, pneumatic, electric actuation, or a combination thereof.

Advantageously, as is readily apparent from the figures, said means 12 for feeding the articles 11 define a bearing surface 120 of the articles 11, in particular in the form of a horizontal or substantially horizontal surface. It shall nonetheless be understood that one could also imagine using feeding belts shaped as a cradle, with concave shape or having inclined surfaces, in particular for transporting unpackaged articles.

Advantageously, as is readily apparent from the figures, said means 12 for feeding the articles 11 are in the form of conveyor belt means 121, in particular defining with the respective upper surface, said bearing surface 120 of the articles 11.

Although it is shown in the accompanying figures, a single conveyor belt 120 for feeding or advancing articles 11, in the form of mutually homogeneous articles, i.e. of the same type, for example in the form of rolls, one could also imagine that said conveyor belt means advance articles that are not homogeneous, or are different from each other and consist of a plurality of conveyor belts parallel to each other and preferably adapted to convey respective types of articles.

As is readily apparent from the figures, in accordance with the first preferred embodiment 10 of apparatus, said means 12 for feeding the articles 11, or the respective bearing surface 120 of the articles 11, in particular defined by said conveyor belt 121, extends linearly, in particular according to the longitudinal direction of development of the apparatus, especially between an upstream end 12' of entry of the articles 11' and a downstream end 12".

Preferably, as is readily apparent from the figures, on said means 12 for feeding the articles 11, or on the respective resting surface 120 of the articles 11, in particular defined by said conveyor belt means 121, the articles 11 are positioned mutually aligned.

Advantageously, as is readily apparent from the figures, on said means 12 for feeding the articles 11, or on the respective resting surface 120 of the articles 11, in particular defined by said conveyor belt means 121, the articles 11 are positioned according to a plurality of longitudinal rows 11', in particular according to a first and second row 11' of articles 11.

Advantageously, as is readily apparent from the figures, the bearing surface 140 for receiving and supporting the products 11 of said treatment unit 14 extends linearly, in particular according to the longitudinal direction of development of the apparatus, in particular between an upstream end and a downstream end, in particular extending parallel to said means 12 for feeding the articles 11, or to the respective bearing surface 120 of the articles 11, thereof.

Advantageously, as is readily apparent from the figures, said treatment unit 14 is provided with means for receiving the articles 11 that advance the same articles 11, or the respective groups of articles 13, according to a longitudinal direction, in particular concordant and/or parallel to that of advance of the articles 11 by said feeding means 12.

Advantageously, as is readily apparent from the figures, said means 16 for transferring the articles 11, in particular the respective transferring device, are positioned above said means 12 for feeding said articles 11, in particular above the corresponding bearing surface 120 of said articles 11, and/or above the treatment unit 14, i.e. above a corresponding surface 140 for receiving and supporting said articles 11.

Advantageously, as reported above and as is readily apparent from the figures, robot means are provided, preferably in the form of parallel robot means, in particular in the form of Delta robot means, in particular defining said means, or respective device, 16 for transferring the articles 11, or in particular defining said means that are adapted to arrange said articles in respective groups 13 of articles.

Preferably, said robot means 16 move the articles 11 that are on said means 12 for feeding said articles 11 and/or on said unit 14 for treating the same articles 11.

In particular, as is readily apparent from the figures, the respective transferring device, or robot, 16 comprises a plurality of movable arms 161 that support and move a respective head 162, which, in particular, mounts, or supports, said means for gripping the respective article 11.

Said movable arms 161 move said head 162 between said pick-up position and said release position according to a path that is mainly transverse to the direction of advance of said articles.

Advantageously, as is readily apparent from the figures, said unit 14 for treating the articles 11 comprises respective means 15 for packaging said groups of articles 13.

Advantageously, as is readily apparent from the figures, in both said first and second embodiment of apparatus, said packaging means 15 comprise means 151 for inserting the articles into the respective package, in particular in the respective wrapping 150, especially obtained from a corresponding film, preferably in the form of a plastic film.

Preferably, said inserting means 151 receive the respective group of articles 13 in a respective receiving position and insert the same group 13 inside the respective package or wrapping 150.

Advantageously, as is readily apparent from the figures, in both said preferred embodiments of apparatus, said means for inserting the articles in the respective package comprise a pusher 151 movable linearly, in particular longitudinally, preferably parallel to the direction of extension of said means 140 for receiving the articles of the respective treatment unit 14 and/or to the direction of extension of said means 12 for feeding the articles.

Advantageously, as is readily apparent from the figures, in both said preferred embodiments of apparatus, said means for packaging the respective articles comprise means for passing the same articles to said means 151 for inserting the group of articles 13 in the respective package or wrapping 150.

Advantageously, as is readily apparent from the figures, said means for passing the same articles to said means 151 for inserting the group of articles 13 in the respective package or wrapping 150 move said articles 11, or the respective group of articles 12, transversely to the direction of extension of said means 140 for receiving the articles of the respective treatment unit 14 and/or to the direction of extension of said means 12 for feeding the articles and/or to the direction of extension of said inserting means 151, in particular to the direction of motion of said pushing means 151.

Advantageously, as is readily apparent from the figures, in the second preferred embodiment 100 of apparatus, said means for passing the same articles to said means 151 for inserting the group of articles 13 in the respective package or wrapping 150 are defined by the same transferring means 16 that directly define the group 13 of articles to be packaged at the respective position 140 of reception of the articles 11 by said inserting means 151.

Advantageously, as is readily apparent from the figures, in the first preferred embodiment 10 of apparatus, means 152 are provided for passing the same articles, or the respective group of articles 13, to said means 151 for inserting the articles 11, or the respective group of articles 13, in the respective package or wrapping, and such passing means 152 move said articles 11, or the respective group of articles 13, between a receipt position and a release position, in particular corresponding to the position of reception by said inserting means 151.

Advantageously, as is readily apparent from the figures, in the first preferred embodiment, 10, said means 152 for passing the same articles to said means 151 for inserting the articles in the respective wrapping, in particular to the respective position of reception thereof, comprise means 152p, 152p that are adapted to maintain the same articles 11 compact with each other.

Advantageously, as is readily apparent from the figures, in the first preferred embodiment 10, said means 152 for passing the group of articles 13, to said means 151 for inserting the same group of articles 13 in the respective package or wrapping, are in the form of respective movable scoop means 152, in particular preferably comprising a first rear scoop for pushing the articles 11, and in particular a second front scoop 152p for maintaining the group of articles 13 in compact condition.

Advantageously, as is readily apparent from the figures, in said preferred first and second embodiments, said means for packaging the group of articles 13 comprise means 153 for readying the respective package, or in particular the wrapping, 150.

Advantageously, as is readily apparent in the figures from 1 to 5 and from 10A to 10D, the latter relating to the second version of the module for realising the apparatus according to the present second preferred embodiment 100, in said first and second preferred embodiments 10 and 100, the means 153 for readying the respective package comprise a respective tunnel 1530, on whose outer surface is wound a corresponding film, in particular a plastic film, for the realisation of the package or wrapping, and into which tunnel 1530 is inserted the respective group 13 of articles to be packaged, which is made to exit from the opposite part of the tunnel 1530 so as to pull the same film 150 in a wound condition to the articles 13.

In particular, as shown, as is readily apparent from the figures, in said first and second preferred embodiments, said means 153 for readying the respective package comprise means for supplying the film, and in particular the plastic film, in the form of a continuous band, which are preferably in the form of respective reel means 1531.

In particular, as shown, as is readily apparent from the figures, in said first and second preferred embodiments, said means 153 for readying the respective package comprise means 1532 for sealing and/or cutting the end of the respective film, in particular plastic, defining said package or wrapping 150.

Advantageously, as is readily apparent from the figures from 6 to 8 and from 9A to 9D, in accordance with a first version of module to be used in the second preferred embodiment 100 of apparatus, said means 153 for readying the respective package comprise means 154 for supplying a predefined package, in particular in the form of a corresponding envelope 150', made of film, preferably of plastic film, at a respective station 1541 for inserting the group of articles 13.

Advantageously, as is readily apparent from the figures from 6 to 8 and from 9A to 9D, in accordance with a first version of module to be used in the second preferred embodiment 100 of apparatus, said means for feeding a predefined package are in the form of corresponding revolver means 154, in particular in the form of a corresponding rotatable vertical plate, having a plurality of seats 1540 defined by a corresponding through opening for the group of articles to be inserted 13 and having respective retaining means, not particularly illustrated, for the respective open end of a predefined package or envelope 150'.

Said seats 1540, of the revolver means 154, are subsequently presented at the respective station 1541 for inserting the group of articles 13 in the package or envelope, and preferably at a station 1542 for forming the respective predefined package or envelope starting from a tubular belt 150' for the definition of respective packages or envelopes.

It would also be imaginable that the respective treatment or packaging means, or the respective module, are configured so as to ready, starting from a laid down, or tubular, film, a respective predefined package, or envelope, for example as illustrated in the Italian patent application no. 102017000150399 held by the same applicant and whose content through the presence reference is to be considered an integral part of the present description. In this case, the means for reading the respective package would comprise means that ready, starting from a respective laid down, or tubular, film, the respective predefined package, in particular in the form a corresponding envelope, made of film, preferably of plastic film.

It would also be imaginable that the present apparatus comprises at least one module that is adapted to provide a respective primary wrapping on the respective group of articles, for example making a package or pack of articles in the form of respective rolls, and another module, in particular downstream, that is adapted to provide a respective secondary wrapping, for example a bag for containing a respective group of packages of articles or rolls previously packaged by a previous module of the present apparatus.

Advantageously, as is readily apparent from the figures, in the first preferred embodiment of apparatus 10, the means 141 for feeding said articles 11, in particular said groups of articles 13, in the respective treatment unit, comprise advancing means, preferably defined by a respective first conveyor 141a, which define said surface 140 for receiving and supporting said articles 11 and that remove the articles 11, or the respective group of articles 13, from the corresponding receipt area and which advancing and receiving means 141a preferably define means for positioning the articles in respective partial forming positions of the respective group of articles 13.

In particular, as shown in the figures, the first preferred embodiment of apparatus 10 is provided with a first and a second positions for forming the group of articles 13, which positions are moved away from each other, according to the longitudinal direction or direction of advance of the articles.

Advantageously, as is readily apparent from the figures, in the first preferred embodiment of apparatus, the means 141 for feeding said articles 11, in particular said groups of articles 13, in the respective treatment unit, comprise, or define, means, in particular in the form of a respective second conveyor 141b, for introducing the group of articles 13 into said means 152 for passing the same group to the packaging means.

Advantageously, as is readily apparent from the figures, in the first preferred embodiment of apparatus, the means 141 for feeding said articles 11, in particular said groups of articles 13, in the respective treatment unit 14, comprise, or define, temporary stop, or buffer, means, of the respective group of articles 13, especially between said means 141 for receiving and advancing the articles and said means 141 for introduction in said passage means 152, in particular in the form of a respective third advancing conveyor 141c.

Advantageously, means for compacting the respective group of articles 13 are provided.

Advantageously, said means for compacting the respective group of articles 13 are provided on said means 141 for feeding said articles 11, in particular said groups of articles 13, in the respective treatment unit 14.

Advantageously, said compacting means provided on said means 141 for feeding said articles 11, in particular said groups of articles 13, are defined by a corresponding abutting surface, not particularly illustrated in the accompanying figures, with respect to which said articles 11 are set down by said transferring means 16, said abutting surface being preferably positioned on the side of said surface 140 for receiving the articles 11 that is oriented towards said means for feeding the articles 12.

Advantageously, said means for compacting the respective group of articles 13 are also provided in said means 152 for passing the respective group of articles 13 to the packaging means 15.

Advantageously, said compacting means provided in said means 152 for passing the respective group of articles 13 to the packaging means 15 comprise a corresponding abutting surface, in particular lateral for said passing means 152, and in any case not particularly illustrated in the accompanying figures, against which the group of articles 13 is set down by said means 141 for feeding said articles 11, in particular said group of articles 13.

Advantageously, as described above, said compacting means provided in said means 152 for passing the respective group of articles 13 to the packaging means 15 comprise a first rear scoop for pushing the articles 11, and a second front scoop 152p for maintaining the group of articles 13 in compact condition.

Advantageously, means 20 are provided for conveying, in particular out of the apparatus, the treated articles 111, specially packaged.

Advantageously, as is readily apparent from the figures from 6 to 10D, in accordance with the second preferred embodiment, said means 20 for conveying the treated or packaged articles 111 are supported vertically aligned to said means for feeding the articles 12.

Advantageously, as is readily apparent from the figures, in accordance with the second preferred embodiment, said means 20 for conveying treated or packaged articles 11t are supported below said means for feeding the articles 12.

Advantageously, as is readily apparent from the figures, in accordance with the second preferred embodiment, said means 20 for conveying treated or packaged articles 111 are in the form of corresponding conveyor belt means.

As shown, in the apparatus 10 or 100 are provided respective supporting means 9, in particular adapted to define a respective support frame, in particular comprising respective metallic section bars.

Advantageously, as is readily apparent from the figures, in accordance with the first preferred embodiment, said means 16 for transferring the articles 11, in particular the respective transferring device, are supported in hanging condition by said supporting means 9 and extend downwards towards said means 12 for feeding said articles 11, in particular towards the corresponding bearing surface 120 of said articles 11, and/or towards the treatment unit 14, or towards a corresponding surface 140 for receiving and supporting said articles 11.

Advantageously, as is readily apparent from the figures, in accordance with the first preferred embodiment, said transferring device, or robot, 16, in particular said first or second transferring device or robot 16, of the respective treatment unit 12, are offset from each other according to the direction of advance, in particular longitudinal, of the same articles 11.

Advantageously, means are provided that are adapted to transport directly in output said groups of articles 13, in particular said means for transporting directly in output said groups of articles 13 are defined by the packaging means 15, preferably functioning in inoperative conditions of the packaging itself.

Advantageously, as is readily apparent from the figures from 1 to 6, in accordance with the first preferred embodiment 10, means 22 are provided for inputting the articles on said means 12 for feeding the same articles 11.

In particular said inputting means comprise means 221 for realising respective rows of articles 11', 11', in particular defined by conveyor means 221, having a respective free end of release of the articles that is movable horizontally.

As is readily apparent from the figures, said conveyor means 221 receive said articles in aligned condition by a corresponding upstream conveyor 222.

Advantageously, in accordance with an additional preferred embodiment not shown in the accompanying figures, the means for feeding the articles 12 comprise a plurality of conveyors for respective articles 11, and in particular having respective means of surface for engaging and supporting the articles 11, and such conveyors of respective articles 11 extend parallel, preferably co-planar, to each other.

Advantageously, as is readily apparent from the figures from 6 to 10D, in accordance with the second preferred embodiment 100, the apparatus comprises a plurality of modules comprising a respective treatment, or packaging, unit 14 and, as illustrated, preferably a corresponding part of the means 12 for feeding the articles 11.

Advantageously, as is readily apparent in the figures from 6 to 10D, in accordance with the second preferred embodiment, the respective module comprises a corresponding part of the conveying means 20, in particular to output from the apparatus, the treated, especially packaged, articles 111.

Advantageously, the articles treated in the form of rolls, in particular of rolls of toilet paper or kitchen paper, packets, in particular containing respective handkerchiefs or napkins made of paper or other material, packages and/or envelopes, in particular containing respective rolls and/or packets, or other materials.

Advantageously, the type of package realised by the apparatus is selected from one or more of the following types: a package, an envelope, a bag, all preferably made of corresponding film, in particular of plastic film, and a box, preferably made of pasteboard or cardboard, or other materials.

A process for the treatment of articles 11 was then also provided, in particular, said articles bring in the form of articles of the tissue sector or of another sector, and especially said articles being defined by products and/or packages of respective products, said products being preferably in the form of rolls, in particular of toilet paper or of kitchen paper, big rolls, wipes, napkins, nappies, sheets, or other, preferably made of paper material, and/or said packagings are preferably in the form of packets, packs, envelopes, bags, pallets or boxes, for example cardboard or pasteboard, or in the form of another type of packaging.

Said process comprises the following steps: feeding said articles to be treated 11, transferring said articles to be treated to a treatment unit 14, and arranging said articles 11 in respective groups 13 of articles, wherein each group of articles 13 comprises one or more articles that are arranged according to a respective and desired configuration of use by said treatment means 4.

According to the process, said step of arranging said articles in respective groups 13 of articles arranged according to a respective and desired configuration, is carried out during the transfer of said articles on the respective treatment unit 14.

Figure 11:
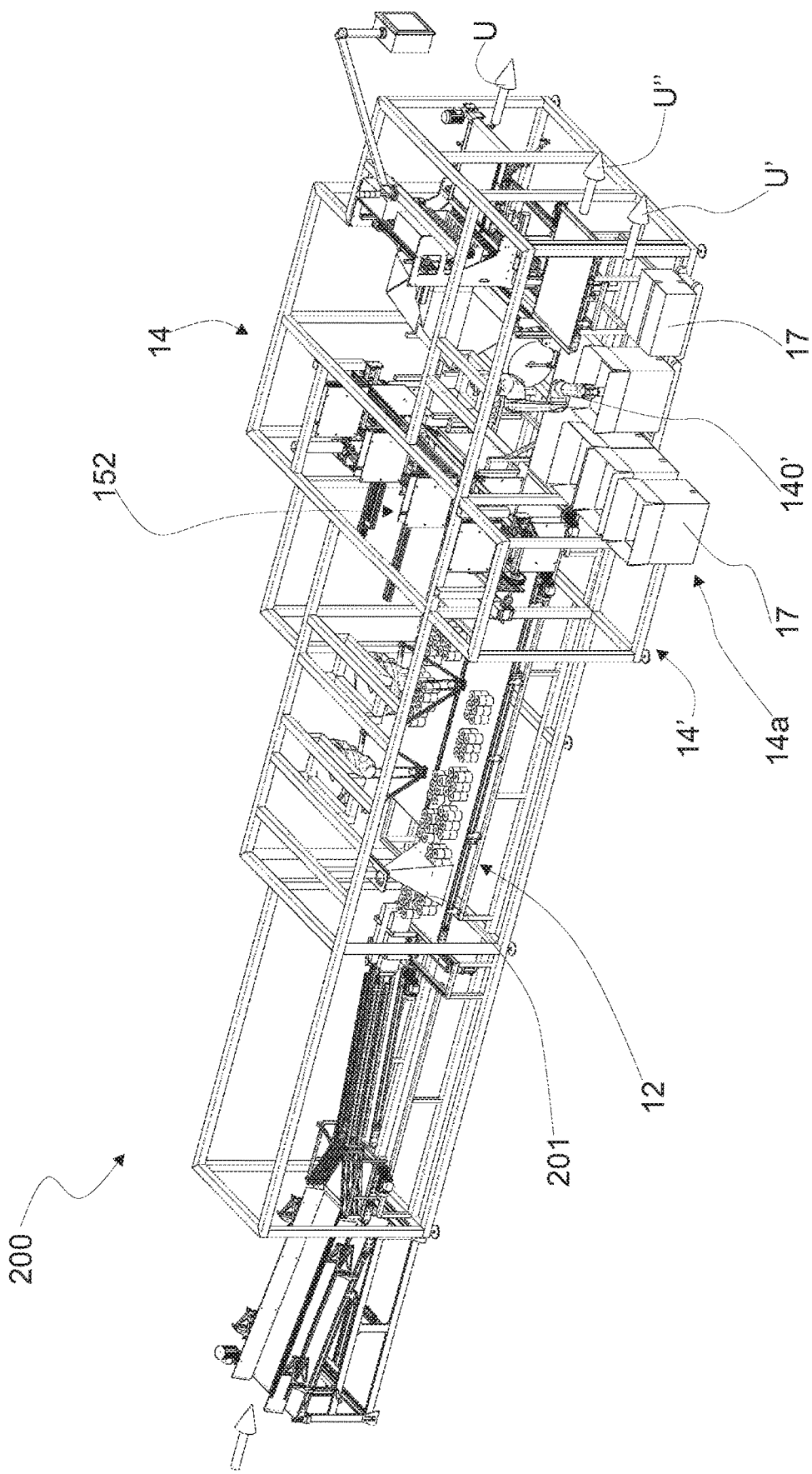
FIG. 11 shows a schematic perspective view of a third preferred embodiment of an apparatus according to the present invention.

The following FIG. 11 shows a third preferred embodiment 200 of an apparatus according to the present invention, and such third preferred embodiment is wholly similar to the first preferred embodiment 10 and the components thereof that are similar or equivalent to those of said first preferred embodiment 10 are designated with the same numerical references that were used in the preceding preferred embodiment and, to avoid excessively burdening the present description, they are not commented in detail again.

In this third preferred embodiment is illustrated in particular the fact that in addition to a U-shaped output of the respective group of articles packaged in a respective wrapping made of film, preferably of plastic film, a possible additional output can also be imaged, for respective group of articles packaged in a respective box 17, for example made of pasteboard or cardboard or other material.

The present third embodiment 200 of apparatus is provided, in a similar manner to the second preferred embodiment of apparatus 100, a plurality of, and in particular a first and a second, treatment unit, 14, 14' in particular in the form of units for packaging the respective group of articles, respectively in a wrapping, preferably of film, in particular of plastic film and in a box, preferably of pasteboard or cardboard.

It must nonetheless be understood that the wrapping provided or used in the present apparatus could be made of corresponding film, or sheet, of paper material.

As illustrated, in this third preferred embodiment 200 of apparatus, said first and second treatment units 14, 14' are transversely aligned, or substantially aligned, to each other with respect to the longitudinal direction of development of the apparatus, or of advance of said articles.

As is readily apparent from FIG. 11, said packaging of the groups of articles in the boxes 17 is carried out on the side of the feeding means 12 that is opposite to the side of packaging in a film wrapping.

As is readily apparent from said FIG. 11, centrally, at the output, is provided an additional output U''' for articles that were not used, for example because they are defective.

For this purpose, the present apparatus has advantageous means for detecting the defectiveness of the articles, of the groups of articles, or of the packages, so as to avoid processing articles, groups of articles, or packages, that are defective.

In particular, FIG. 11 show means 201 for detecting the defectiveness of the articles provided on said means 12 for feeding the same articles. According to a preferred operating mode, the articles deemed defective may not be picked up by said transfer means 16.

Said means 201 for detecting the defects could for example be configured as provided in the international patent applications WO 2016/135662, WO 2016/135664 and WO 2016/135667 held by the same applicant, and whose content, through the present reference, must be considered as an integral part of the present description.

As is readily apparent from said FIG. 11, boxing means 14' are provided that comprise means 14a for feeding the box bodies 17 in open condition, in particular as shown advancing them according to a direction transverse to the longitudinal direction of development of the apparatus, and means, or devices, 140' for picking up and inserting the group of articles in the respective open box body.

In particular, said means 140' pick up the group of articles from a respective position, in which were positioned by corresponding means, for example by the same means 152 that pass the same articles to said means 151 for inserting the group of articles 13 in the respective package or wrapping 150, of film, preferably of plastic film, or to the other treatment unit 14.

As is readily apparent from said FIG. 11, said pick-up means, or member 140' insert the respective group of articles in a corresponding open box 17, preferably open upwards and appropriately fed towards the loading position, and such box 17 is then closed and fed to the output U', in particular in longitudinal or parallel direction to the direction of advance of the articles 11, or parallel to the direction of exit of the packages prepared in the other packaging unit 14 of the apparatus.

Figure 12:
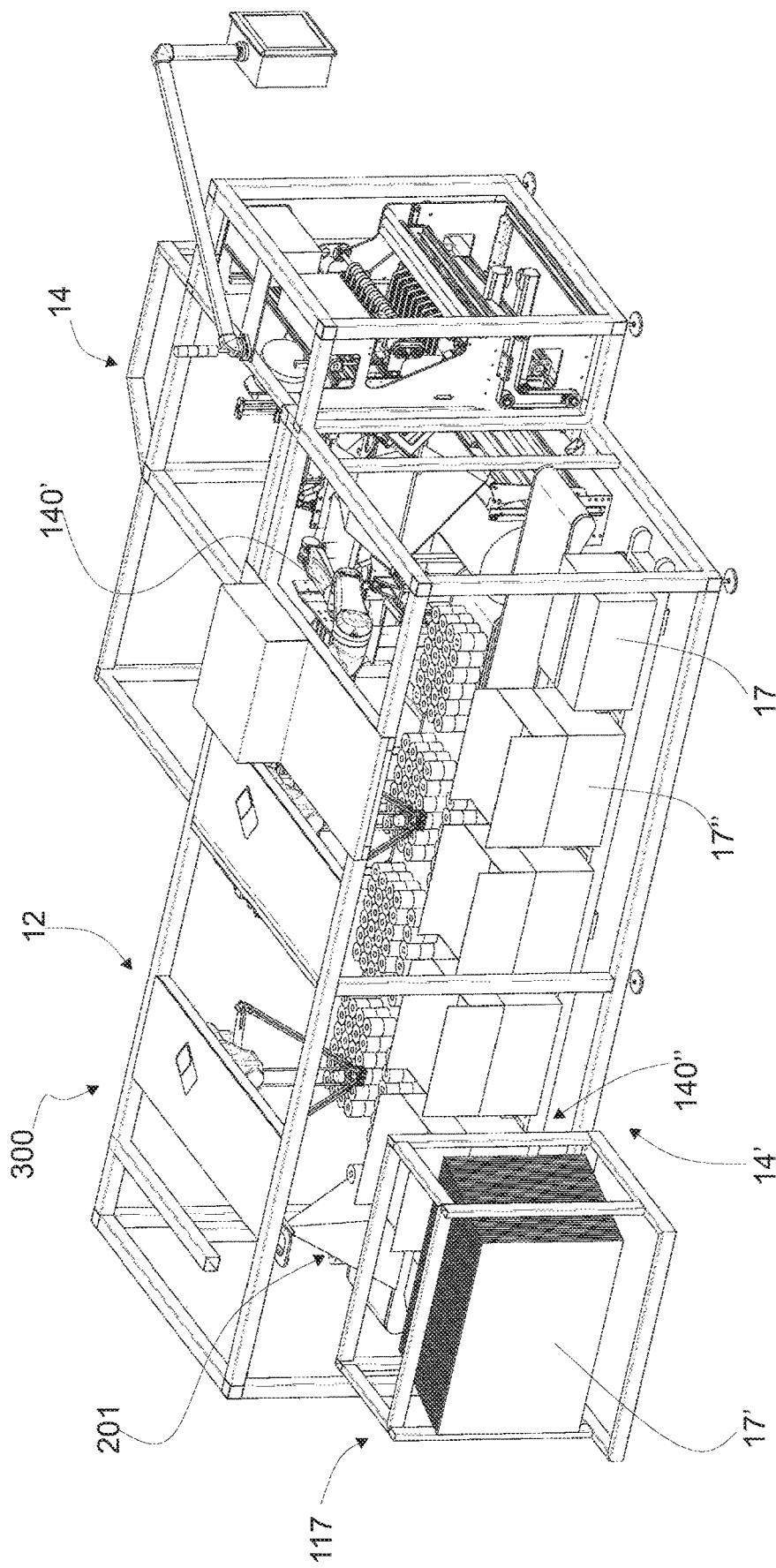
FIG. 12 shows a schematic perspective view of a second version of the third preferred embodiment of an apparatus according to the present invention.

In the following FIG. 12 shows a second version 300 of the third preferred embodiment of apparatus, whose components that are similar, or equivalent, to those of the preceding preferred embodiments 200 are designated with the same numerical references and, to avoid excessively burdening the present description, they are not further commented in detail.

This second version 300 of the third preferred embodiment is provided with respective storage means or magazine 117 for flat sheets 17', in particular in the form of already rough-hewn sheets, of pasteboard or cardboard, from which through corresponding means 140'' for folding and mutually joining corresponding panels of the box body 17, respective boxes 17 are defined, in open condition, to be filled through said means or device, 14' for picking up and inserting a respective group of articles in a corresponding open box body 17'', preferably open upwards. Once the body of articles is inserted in the respective open box body, said box body is closed fed to the output in a wholly similar manner to the one illustrated in the preceding version of FIG. 11.

It must also be understood that the means 16 for transferring the products in making the respective group of articles, when necessary, operate in such a way as to change the spatial orientation that the respective article has on said feeding means 12.

In particular, for example said transferring means 16 could orient rolls, present on feeding means 12 and having its own longitudinal axis directed vertically, so as to arrange them with the same longitudinal axis directed horizontally, or directed in any other desired way.

According to yet another embodiment, one could also imagine an apparatus in which one or more respective treatment units consist simply of means for conveying the respective group of articles towards a respective destination, in particular of use, thereof, or towards an area for unloading defective products.

In practice, as is evident, the technical features illustrated above allow, individually or in respective combination, the present invention to achieve one or more of the following advantageous results:

it is possible to have available an apparatus that is particularly flexible to use or employ;

it is possible to have available an apparatus that is able to operate on several types of products and that is adapted to generate several types of packages;

it is possible to have available an apparatus that is easily adaptable to meet the needs of users or consumers;

it is possible to have available an apparatus that operates in a particularly effective and/or efficient manner;

it is possible to have available an apparatus that has a particularly reduced bulk;

it is possible to have available an apparatus that allows to easily carry out restoring interventions in case of problems;

it is possible to have available an apparatus whose construction or set-up is easy and relatively quick;

it is possible to have available an apparatus that allows an easy reutilisation of components;

it is possible to have available an apparatus that is particularly easy and simple to operate;

it is possible to have available an apparatus that makes it possible to avoid excessively high investment costs;

it is possible to have available an apparatus that has a construction cost that is as low as possible.

The invention thus conceived is susceptible of evident industrial application. The person skilled in the art will, moreover, be able to imagine numerous variants and/or modifications to be made to the invention illustrated in the specific preferred embodiment, without departing from the scope of the inventive concept, as is amply disclosed above. Moreover, additional preferred embodiments of the invention can be imagined that comprise one or more of the features illustrated above. Moreover, it must be understood that all details can be replaced by technically equivalent elements.

The invention claimed is:

1. An apparatus for the treatment of articles being defined by products and/or by packages of the products, the apparatus comprising:

a first feeding device configured for feeding said articles, the first feeding device including at least one driven conveyor belt, a treatment device configured for treating said articles, a transfer device configured for transferring said articles from said first feeding device to the treatment device, an arrangement device configured to arrange said articles in respective groups of articles, in which each of the respective groups of articles includes one or more of a plurality of articles that are arranged according to a respective and desired configuration of use by said treatment device, wherein said arrangement device is defined by the transfer device, which includes a plurality of robots, with each of the plurality of robots providing a respective portion of the articles for the each of the respective groups of articles, wherein the treatment device comprises a packaging device configured for inserting the respective groups of articles into respective packages, the packaging device configured for receiving the respective groups of articles in a respective receipt position and inserting the respective groups of articles inside the respective packages, such that the articles leaving the treatment device are packaged but not palletized, the at least one driven conveyor belt being configured to advance articles that are not homogeneous, or that are different from each other, the at least one driven conveyor belt including a plurality of driven conveyor belts side by side and parallel to each other and adapted to convey the articles that are not homogeneous, or that are different from each other to the transfer device and to the packaging device;

wherein the first feeding device includes a first bearing surface configured for receiving and supporting the articles, and the transfer device is positioned above the first bearing surface;

a support structure supporting the transfer device in a hanging condition to extend downward toward the first bearing surface;

the plurality of robots comprising a first robot and a second robot;

the first and second robots each contributing a respective quantity of the articles to each of the groups of articles, transferring the articles that are picked up from a respective row of articles being fed by the first feeding device;

the treatment device comprising a second feeding device configured for feeding the groups of articles in the treatment device, the second feeding device including a second bearing surface and configured for receiving and supporting the articles in respective partial forming positions of the respective groups of articles, the second feeding device being configured for removing the groups of articles or parts thereof from the corresponding reception area, the first feeding device and the second feeding device being parallel to each other and arranged side by side to have parallel respective longitudinal advancement directions, the first and second robots moving the respective articles from the first feeding device to the second feeding device in a direction transverse to the parallel longitudinal advancement directions.

2. The apparatus according to claim 1, and further comprising a plurality of the treatment devices and a plurality of the transfer devices, with each of the treatment devices having a respective and dedicated one of the transfer devices.

3. The apparatus according to claim 2, wherein the treatment devices are distributed along the longitudinal advancement direction of the first feeding device.

4. The apparatus according to claim 2, wherein each of the treatment devices is positioned at a respective longitudinal area of the first feeding device, or at a respective area along the longitudinal advancement direction of the first feeding device.

5. The apparatus according to claim 2, wherein the treatment devices, being adjacent to one another, are positioned at areas of the first feeding device situated along the longitudinal advancement direction of the first feeding device.

6. The apparatus according to claim 2, wherein the treatment devices are arranged on both sides, of the first feeding device.

7. The apparatus according to claim 1, wherein the transfer device is configured to modify a configuration of the respective group of articles passed to the treatment device.

8. The apparatus according to claim 1, wherein each transfer device is configured to move a single one of the articles at a time, or a plurality of the articles at a time.

9. The apparatus according to claim 1, wherein the respective transfer device is configured to perform an outward stroke between a pick-up position of one of the articles, and a release position of the one of the articles, and a return stroke between said release position and said pick-up position; and wherein the respective transfer device is adapted to pick up the one of the articles from said first feeding device and/or said transfer device is adapted to release the one of the articles to the treatment device.

10. The apparatus according to claim 1, wherein the respective transfer device comprises grippers configured to grip the articles.

11. The apparatus according to claim 1, wherein said first bearing surface is an upper surface of the at least one driven conveyor belt.

12. The apparatus according to claim 1, wherein, the first bearing surface of the at least one driven conveyor belt is configured to receive the articles positioned mutually aligned.

13. The apparatus according to claim 12, wherein the second feeding device includes a conveyor belt having the second bearing surface.

14. The apparatus according to claim 13, wherein the second bearing surface is arranged side by side with the first bearing surface, and wherein said treatment device includes a receiving device configured to receive and advance the articles, or the respective groups of articles, according to the longitudinal advancement directions.

15. The apparatus according to claim 1, wherein said second bearing surface is horizontal or substantially horizontal surface.

16. The apparatus according to claim 1, wherein each of the plurality of robots is a Delta robot.

17. The apparatus according to claim 16, wherein each of the plurality of robots comprises a plurality of movable arms that support and move a respective head supporting grippers configured to grip the articles.

* * * * *